United States Patent [19]

Tanaka et al.

[11] Patent Number: 5,736,265
[45] Date of Patent: Apr. 7, 1998

[54] MAGNETO-OPTICAL RECORDING MEDIUM AND RECORDING METHOD USING THE SAME

[75] Inventors: Motoharu Tanaka; Atsuyuki Watada, both of Kawasaki; Toshiaki Tokita, Zama, all of Japan

[73] Assignee: Ricoh Company, Ltd., Tokyo, Japan

[21] Appl. No.: 263,947

[22] Filed: Jun. 22, 1994

Related U.S. Application Data

[63] Continuation of Ser. No. 793,853, Nov. 18, 1991, abandoned.

[30] Foreign Application Priority Data

Nov. 19, 1990 [JP] Japan .................. 2-313324
Jan. 18, 1991 [JP] Japan .................. 3-018445
Jan. 18, 1991 [JP] Japan .................. 3-018446
Sep. 6, 1991 [JP] Japan .................. 3-254566

[51] Int. Cl.$^6$ ........................................ G11B 5/66
[52] U.S. Cl. ................ 428/694 ML; 428/694 SC; 428/694 EC; 428/694 MM; 428/900; 369/13
[58] Field of Search ............... 428/694 SC, 694 EC, 428/694 ML, 694 MM, 900; 369/13

[56] References Cited

FOREIGN PATENT DOCUMENTS

| 0233034 | 2/1987 | European Pat. Off. . |
| 0258978 | 7/1987 | European Pat. Off. . |
| 61-079216 | 4/1986 | Japan . |
| 61-79216 | 4/1986 | Japan . |

*Primary Examiner*—Leszek Kiliman
*Attorney, Agent, or Firm*—Cooper & Dunham LLP

[57] ABSTRACT

A magneto-optical recording medium includes a recording layer which is composed of A memory layer comprising a ferromagnetic layer with perpendicular anisotropy, and an auxiliary layer comprising antiferromagnetic layer which exhibits an antimagnetic phase at room temperature, and a ferromagnetic phase at temperatures near the Curie temperature of the memory layer which is higher than room temperature, because of the occurrence of magnetic phase transformation, with the memory layer and the auxiliary layer being overlaid. A magneto-optical recording method using this magneto-optical recording medium is described.

4 Claims, 2 Drawing Sheets

MAGNETO-OPTICAL RECORDING MEDIUM AND RECORDING METHOD USING THE SAME

This application is a continuation of Ser. No. 793,853, filed Nov. 18, 1991 now abandoned.

BACKGROUND OF THE INVENTION

1. Field of the Invention

The present invention relates to a magneto-optical recording medium capable of overwriting, and a method of recording information by use of the magneto-optical recording medium.

2. Discussion of Background

Recently, magneto-optical recording media utilizing magneto-optical effects, which are used as rewritable optical recording media, have been actively studied and developed. Some of these are in fact used in practice. The magneto-optical recording media are expected to be utilized for filing document information, as file memories for video images and still pictures, and memory devices for computers. There are still several technical problems which must be solved in order to improve the performance of the magneto-optical recording media to a level equal to or higher than that of magnetic disks. One of the most significant problems is in the overwrite technology. Currently proposed overwrite systems can be roughly classified into magnetic-field modulation systems and light modulation systems including a multi-beam system and a two-layer system.

In the magnetic-field modulation system, recording is performed by reversing the polarity of a magnetic field applied in accordance with the information to be recorded. In this system, the polarity of the magnetic field has to be reversed at high speed, so that a magnetic head of a floating type has to be employed, which makes it difficult to change the recording medium to be used therewith.

On the other hand, in the light modulation system, recording is performed by enabling or disabling the application of a laser beam or by subjecting the laser beam to a intensity modulation in accordance with information to be recorded. The multi-beam system which belongs to the light modulation system is a pseudo-overwrite system in which the direction of the magnetic field employed is reversed for each rotation of a medium by using two or three laser beams, so that recording and erasure are conducted for each track of the medium. This system has the shortcoming that an apparatus for this system has a complicated structure and is expensive. The two-layer system is directed to the accomplishment of overwriting by use of a magneto-optical recording medium with a recording layer which is divided into two layers. This system is disclosed, for instance, in Japanese Laid-Open Patent Application 62-175948. In the two-layer system disclosed in this reference, a magneto-optical recording medium with a recording layer consisting of a memory layer comprising TbFe and an auxiliary layer comprising TbFeCo is employed. Overwriting is accomplished by initializing the recording medium and then applying thereto laser beams with different powers and an external magnetic field. More specifically, in this system, the magnetization of the auxiliary layer is oriented in one direction with application of a magnetic field for initialization prior to a recording step, the temperature T of the recording medium is raised above the Curie temperature $T_{c2}$ of the auxiliary layer, that is, $T>T_{c2}$, with application of a high power laser beam, a magnetic field for recording with a magnetization direction opposite to that of the magnetic field for initialization is applied, thereby reversing the magnetization of the auxiliary layer, and the magnetization is transferred to the memory layer when the recording medium is cooled, whereby recording is accomplished. Furthermore, the recorded information can be erased by raising the temperature T of the recording medium to a temperature between $T_{c1}$ and $T_{c2}$ that is, $T_{c1}<T<T_{c2}$, where $T_{c1}$ is the Curie temperature of the memory layer, with application of a low power laser beam thereto and transferring the magnetization direction of the auxiliary layer to the memory layer. This system has the shortcoming that it is difficult to design a suitable recording medium for this system.

SUMMARY OF THE INVENTION

It is therefore a first object of the present invention to provide a magneto-optical recording medium with the above-mentioned conventional shortcomings eliminated, which has high operational reliability, is simple in design and is capable of overwriting by a single laser beam and a single magnetic field.

A second object of the present invention is to provide an magneto-optical recording method which employs the above magneto-optical recording medium.

The first object of the present invention is achieved by a magneto-optical recording medium comprising a recording layer which comprises (a) a memory layer comprising a ferromagnetic layer with perpendicular anisotropy, and (b) an auxiliary layer comprising anti-ferromagnetic layer which exhibits an antimagnetic phase at room temperature, and a ferromagnetic phase at temperatures near the Curie temperature of the memory layer which is higher than room temperature, because of the occurrence of magnetic phase transformation, with the memory layer and the auxiliary layer being overlaid. The first object of the present invention can also be achieved by a magneto-optical recording medium of the above-mentioned type in which an intermediate layer is further provided between the memory layer and the auxiliary layer in order to adjust the exchange bonding force between the two layers.

Furthermore, the first object of the present invention can also be achieved by a magneto-optical recording medium of the above-mentioned type in which the auxiliary layer has a lower thermal conductivity than that of the memory layer.

The second object of the present invention can be achieved by a magneto-optical recording method by using any of the above-mentioned magneto-optical recording media, comprising the steps of (1) applying a laser beam to the magneto-optical recording medium during recording under the conditions that the temperature of the recording medium is raised to a temperature T, with application of an external bias magnetic field $H_{ex}$ thereto, with the temperature T satisfying the relationship $T_{pc} \leq T<T_b$ wherein $T_{pc}$ is the magnetic phase transition temperature of the auxiliary layer, and $T_b$ is the temperature at which the coercive force of the auxiliary layer is equal to the intensity of the external bias magnetic field $H_{ex}$, and (2) applying a laser beam to the magneto-optical recording medium during erasure under the conditions that the temperature of the recording medium is raised to a temperature T, with application of the external bias magnetic field $H_{ex}$ thereto as during recording, with the temperature T satisfying the relationship $T_a<T<T_{pc}$, wherein $T_a$ is the temperature at which the coercive force of the memory layer is equal to the intensity of the external bias magnetic field $H_{ex}$.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

A magneto-optical recording medium according to the present invention comprises a recording layer which comprises (a) a memory layer comprising a ferromagnetic layer with perpendicular anisotropy, and (b) an auxiliary layer comprising antiferromagnetic layer which exhibits an antimagnetic phase at room temperature, and a ferromagnetic phase resulting from the occurrence of magnetic phase transformation at temperatures near the Curie temperature of the memory layer which is higher than room temperature, with the memory layer and the auxiliary layer being overlaid.

Figure 1:
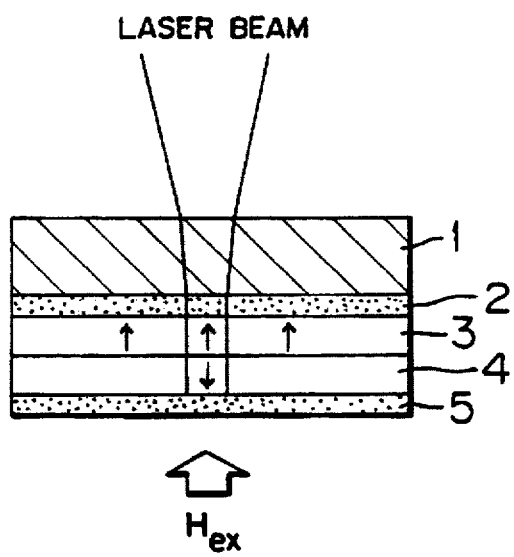
FIG. 1 is a schematic cross-sectional view of a magneto-optical recording medium according to the present invention.

FIG. 1 is a schematic cross-sectional view of an example of such a magneto-optical recording medium according to the present invention. In this recording medium, a protective layer 2 with a thickness of 100 Å–5000 Å, made of a material such as $Si_3N_4$, SiO, or $SiO_2$, is provided on a transparent support 1, which is made of, for example, glass, plastics, or ceramics. On the protective layer 2, there is provided a ferromagnetic layer 3 with perpendicular anisotropy. On the ferromagnetic layer 3, there is provided an antiferromagnetic layer 4 with a thickness of 100 Å–10000 Å which exhibits an antimagnetic phase at room temperature, and a ferromagnetic phase resulting from the occurrence of magnetic phase transformation at temperatures near the Curie temperature of the ferromagnetic layer 3 which is higher than room temperature. A protective layer 5 with a thickness of 100 Å–5000 Å, made of a material such as $Si_3N_4$, SiO, or $SiO_2$, is provided on the antiferromagnetic layer 4.

Each of the above layers can be formed by conventional film formation methods such as the sputtering method, the vacuum deposition method, and the ion-plating method.

The ferromagnetic layer 3 can be made of, for example, a rare earth element—transition metal amorphous alloy layer, made of an alloy such as Tb—Fe, Gd—Fe, Dy—Fe, Gd—Tb—Fe, Tb—Dy—Fe, Gd—Dy—Fe, Tb—Fe—Co, Gd—Fe—Co, Dy—Fe—Co, Tb—Dy—Fe—Co, Gd—Tb—Fe—Co, or Gd—Dy—Fe—Co; or a poly-crystalline film, made of Mn—Bi, Mn—Cu—Bi, Co—Pt, Co—spinel ferrite, or Ba—ferrite.

The antiferromagnetic layer 4 can be made of, for example, $Mn_2Sb$, or $(Mn)_pSb(Y)_q$ wherein Y is Cr, Ti, or V, and p=2−q.

Figure 2:
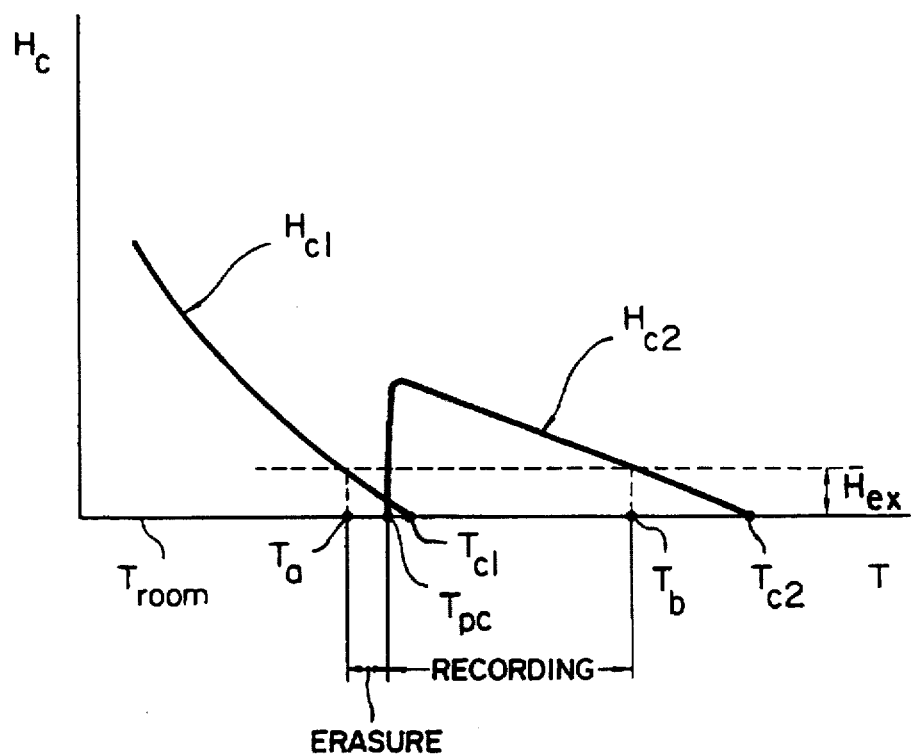
FIG. 2 is a diagram showing the temperature-dependence of the coercive force of a ferromagnetic layer and an antiferromagnetic layer for use in a magneto-optical recording medium according to the present invention.

These ferromagnetic layer 3 and the antiferromagnetic layer 4 must have the temperature characteristics with respect to the coercive force thereof as shown in FIG. 2. More specifically, if the Curie temperature of the ferromagnetic layer 3 is $T_{c1}$, the Curie temperature of the antiferromagnetic layer 4 is $T_{c2}$, the magnetic phase transition temperature of the antiferromagnetic layer 4 is $T_{pc}$, the temperature at which the coercive force $H_{c1}$ of the ferromagnetic layer 3 is equal to the intensity of the external bias magnetic field $H_{ex}$ is $T_a$, and the temperature at which the coercive force $H_{c2}$ of the antiferromagnetic layer 4 is equal to the intensity of the external bias magnetic field $H_{ex}$ is $T_b$, it is necessary that these satisfy the following relationships:

When $T_{pc} \leq T < T_b$, $H_{c2} > H_{c1} + H_{ex}$.

When $T_a < T < T_{pc}$, $H_{c1} < H_{ex}$.

When $T \leq T_a$, $H_{c1} \geq H_{ex}$.

Figure 3:
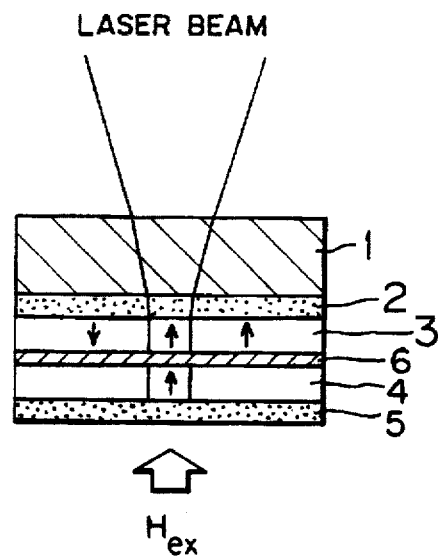
FIG. 3 is a schematic cross-sectional view of another magneto-optical recording medium according to the present invention.

FIG. 3 is a schematic cross-sectional view of another example of a magneto-optical recording medium according to the present invention. The only difference between this magneto-optical recording medium and the magneto-optical recording medium shown in FIG. 1 is that an intermediate layer 6 is provided between the ferromagnetic layer 3 and the antiferromagnetic layer 4 in this recording medium in order to adjust the exchange bonding force between the two layers 3 and 4. It is necessary that the magnetic characteristics of the ferromagnetic layer (memory layer) 3 and the anti-ferromagnetic layer (auxiliary layer) 4 satisfy the following relationship during recording:

$$H_{c1} < H_{c2} - \sigma w/(2M_s \cdot h) - H_{ex}$$

wherein $H_{c1}$ is the coercive force of the ferromagnetic layer 3, $H_{c2}$ is the coercive force of the antiferromagnetic layer 4, σw is the domain wall energy between the ferromagnetic layer 3 and the antiferromagnetic layer 4, Ms is the saturation magnetization of the antiferromagnetic layer 4, h is the thickness of antiferromagnetic layer 4, and $H_{ex}$ is the intensity of the bias magnetic field.

In the case of the magneto-optical recording medium as shown in FIG. 1, the materials for the magnetic layers 3 and 4 must be selected to satisfy the above relationship. However, in the case of the magneto-optical recording medium as shown in FIG. 3, the above relationship can be satisfied not only by the choice of the materials for the magnetic layers 3 and 4, but also by adjusting the thickness of the intermediate layer 6, so that the choice range for materials for the magnetic layers 3 and 4 can be expanded by the provision of the intermediate layer 6.

It is preferable that the materials for the intermediate layer 6 be non-magnetic materials or magnetic materials with in-plane magnetic anisotropy, which do not cause the magnetic layers 3 and 4 to deteriorate. Examples of such materials are not only the previously mentioned rare earth element—transition metal based amorphous film, but also Si, Al, Ag, Au, Cu, Fe, Co, Ni, Cr, Si—N, Al—N, and Fe—N. It is preferable that the intermediate layer 6 have a thickness in the range of from several Å to about 5000 Å. When the intermediate layer 6 is too thin, the effect of adjusting the exchange bonding force between the two magnetic layers 3 and 4 cannot be obtained, while when the intermediate layer 6 is too thick, the exchange bonding force between the two magnetic layers 3 and 4 becomes so small that proper recording and erasing cannot be performed. The intermediate layer 6 can be formed by conventional film formation methods such as the sputtering method, the vacuum deposition method, and the ion-plating method.

In the magneto-optical recording media as shown in FIG. 1 and FIG. 3, when the materials for the ferromagnetic layer 3 and the antiferromagnetic layer 4 are chosen in such a manner that the material for the antiferromagnetic layer 4 has a lower thermal conductivity than that of the material for the ferromagnetic layer 3, since the thermal conductivity of the ferromagnetic layer 3 is greater than the thermal conductivity of the antiferromagnetic layer 4, the temperature of the ferromagnetic layer 3 is more quickly decreased than that of the antiferromagnetic layer 4 during recording, so that the magnetization of the antiferromagnetic layer 4 is maintained until the magnetization of the ferromagnetic layer 3 becomes high. Thus, high and excellent reliability can be obtained with respect to the recording and erasing.

The structure of the magneto-optical recording medium according to the present invention is not limited to the structures shown in FIG. 1 and FIG. 3, but can be modified or changed. For instance, a reflective layer can be provided on the protective layer 5, or the protective layers 2 and 5 can be appropriately removed.

A magneto-optical recording method using any of the magneto-optical recording media shown in FIG. 1 and FIG. 3 will now be explained.

Figure 4A:
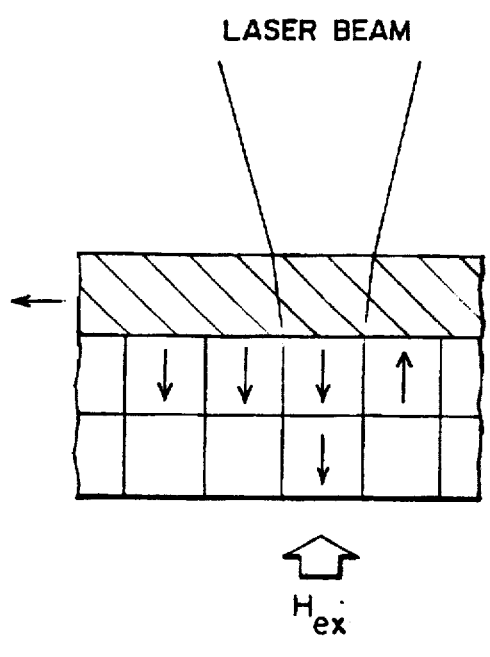
FIG. 4(a) is a diagram showing a magnetized state of a magneto-optical recording medium of the present invention during recording.

Recording is performed by application of a laser beam with high power to a portion in which information is to be recorded in the magneto-optical recording medium to increase the temperature to a temperature near the Curie temperature $T_{c1}$ of the ferromagnetic layer 3, and at the same time, by application of an external bias magnetic field $H_{ex}$. In the portion in which information is to be recorded, the magnetized direction of the ferromagnetic layer 3 has been upward (or downward), and the magnetization of the antiferromagnetic layer 4 has been apparently zero in a normal medium driving state. However, by the application of the laser beam with high power, the temperature of the recording portion is raised to a temperature near $T_{c1}$, so that the magnetization of the portion in the ferromagnetic layer 3 is caused to disappear or made zero. On the other hand, the magnetic phase of the antiferromagnetic layer 4 is changed from the antiferromagnetic phase to a ferromagnetic phase because of the occurrence of magnetic phase transition at $T_{pc}$, and the magnetization in the downward direction in the figure which direction is opposite to the saturation magnetization direction. The downward magnetization is transferred to the ferromagnetic layer 3 in the course of the cooling process and maintained. The magnetization phase of the antiferromagnetic layer 4 becomes an antiferromagnetic phase, when returned to room temperature, so that the apparent magnetization thereof is zero. However, because of the presence of an antiferromagnetic bonding, the magnetization is not reversed even when an external large magnetic field is applied and stable. Furthermore, since the magnetization of the antiferromagnetic layer 4 does not have any effect on the magnetization of the ferromagnetic layer 3 at room temperature, the recording reliability is improved. FIG. 4(a) shows the state of the magnetization of the recording medium after recording has been made, during the elevation of the temperature. The temperature during recording is in the range of $T_{pc} \leq T < T_b$. When the temperature is raised above $T_b$, the magnetization direction of the antiferromagnetic layer 4 is directed toward the direction of the bias magnetic field $H_{ex}$, which is upward in the figure, so that recording become impossible.

Figure 4B:
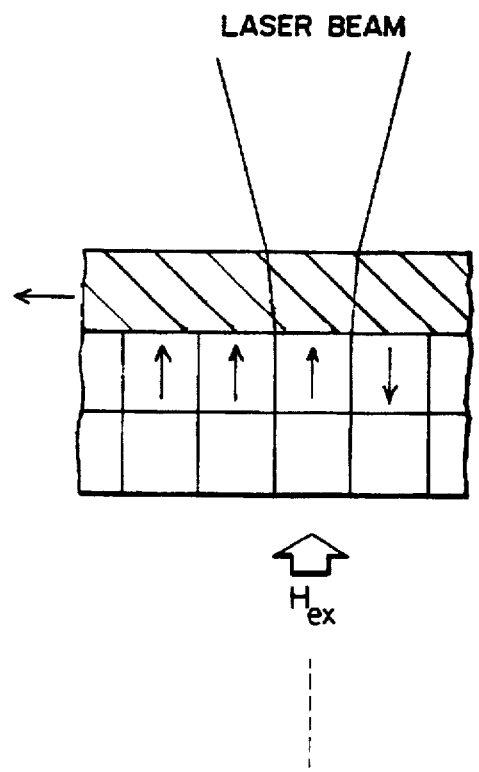
FIG. 4(b) is a diagram showing a magnetized state of the magneto-optical recording medium shown in FIG. 4(a) during erasure.

Erasing is performed by application of a laser beam with smaller power than that of the laser beam applied during recording to a portion from which recorded information is to be erased in the magneto-optical recording medium to raise the temperature to a temperature T of the relationship $T_a \leq T < T_{pc}$, and at the same time, by application of the external bias magnetic field $H_{ex}$ as shown in FIG. 4(b). The antiferromagnetic layer 4 exhibits an antiferromagnetic phase at this temperature, so that the magnetization is apparently zero. Furthermore, the relationship between the coercive force $H_{c1}$ of the ferromagnetic layer 3 and the external magnetic field $H_{ex}$ satisfies the relationship $H_{c1} < H_{ex}$. Therefore, the magnetization of the ferromagnetic layer 3 is directed upward, so that erasing can be performed.

Reproduction is performed by application of a laser beam with a power level at which the temperature of the recording medium becomes $T_a$ or less.

Thus, the magnetization of the auxiliary layer comprising the antiferromagnetic layer is always directed in the same direction. Therefore, no initialization for magnetization is necessary and overwrite is possible by use of a single beam and a single magnetic field.

It is also possible to apply a laser beam to the recording medium in such a manner that both the ferromagnetic layer (memory layer) 3 and the antiferromagnetic layer (auxiliary layer) 4 reach a temperature which satisfies the relationship $T_{pc} \leq T < T_b$ during recording, and to apply a laser beam to the recording medium in such a manner that only the ferromagnetic layer (memory layer) 3 satisfies the relationship $T_a \leq T < T_{pc}$ during erasing. When the above procedure is employed, the temperature of the antiferromagnetic layer 4 is surely below $T_{pc}$ during erasing, so that the magnetization of the ferromagnetic layer 3 can be oriented in the direction of the external magnetic field $H_{ex}$ without fail. As the result, the recording and erasing reliability can be increased.

The features of this invention will become apparent in the course of the following description of exemplary embodiments, which are given for illustration of the invention are not intended to be limiting thereof.

EXAMPLE 1

The following layers were successively overlaid on a grooved polycarbonate substrate with a diameter of 130 mm in vacuum by the rf-magnetron sputtering to form a recording medium with a layered structure as shown in FIG. 1:

Protective Layer: $Si_3N_4$ layer (1000 Å)

Ferromagnetic Layer: $Tb_{0.2}(Fe_{0.95}Co_{0.05})_{0.8}$ layer (600 Å)

Antiferromagnetic Layer: $Mn_{1.5}SbCr_{0.5}$ layer (1500 Å)

Protective Layer: $Si_3N_4$ (1000 Å)

The Curie temperature $T_{c1}$ of the ferromagnetic layer, the Curie temperature $T_{c2}$ of the antiferromagnetic layer, the magnetic phase transition temperature $T_{pc}$, the temperature $T_a$ at which the coercive force $H_{c1}$ of the ferromagnetic layer is equal to the bias magnetic field $H_{ex}$, and the temperature $T_b$ at which the coercive force $H_{c2}$ of the antiferromagnetic layer is equal to the bias magnetic field $H_{ex}$ were as follows:

$T_{c1} = 150°$ C.

$T_{c2} = 260°$ C.

$T_{pc} = 120°$ C.

$T_a = 80°$ C.

$T_b = 200°$ C.

Signals with a recording frequency of 1 MHz were recorded and reproduced in the thus obtained recording medium by driving at a line speed of 10 m/sec, with application of an external magnetic field $H_{ex}$ (=800 Oe) in the same direction during both recording and erasing, and with the power of the applied laser beam changed during recording, erasing, and reproducing as follows, hereby the recording and reproducing characteristics of this recording medium were evaluated:

Laser power during recording: 7 mW

Laser power during erasing: 4 mW

Laser power during reproducing: 1 mW

As a result, the C/N ratio thereof was 48 dB. Signals with a recording frequency of 2 MHz were overwritten on the above recording medium under the same conditions as mentioned above. The result was that the C/N ratio was 47 dB, which was excellent.

EXAMPLE 2

The following layers were successively overlaid on a grooved polycarbonate substrate with a diameter of 130 mm in vacuum by the same rf-magnetron sputtering as employed in Example 1 to form a recording medium with a layered structure as shown in FIG. 3:

Protective Layer: $Si_3N_4$ layer (1000 Å)

Ferromagnetic Layer: $Tb_{0.2}(Fe_{0.95}Co_{0.05})_{0.8}$ layer (600 Å)

Antiferromagnetic Layer: $Mn_{1.8}SbCr_{0.2}$ layer (1500 Å)

Intermediate Layer: $Si_3N_4$ layer (10 Å)

Protective Layer: $Si_3N_4$ layer (1000 Å)

The $T_{c1}$, $T_{c2}$, $T_{pc}$, $T_a$ and $T_b$ of this recording medium were respectively as follows:

$T_{c1}$=150° C.

$T_{c2}$=240° C.

$T_{pc}$=110° C.

$T_a$=80° C.

$T_b$=190° C.

The recording and reproducing characteristics of this recording medium were evaluated in the same manner as in Example 1. As a result, the C/N ratio thereof was 48 dB. Signals with a recording frequency of 2 MHz were overwritten on the above recording medium under the same conditions as mentioned above. The result was that the C/N ratio was 47 dB, which was excellent.

EXAMPLE 3

The following layers were successively overlaid on a grooved polycarbonate substrate with a diameter of 130 mm in vacuum by the same rf-magnetron sputtering as employed in Example 1 to form a recording medium with a layered structure as shown in FIG. 1:

Protective Layer: $Si_3N_4$ layer (10000 Å)

Ferromagnetic Layer: $Tb_{0.2}(Fe_{0.95}Co_{0.05})_{0.8}$ layer (400 Å)

Antiferromagnetic Layer: $Mn_{1.5}SbCr_{0.5}$ layer (2000 Å)

Protective Layer: $Si_3N_4$ layer (1000 Å)

The $T_{c1}$, $T_{c2}$, $T_{pc}$, $T_a$ and $T_b$ of this recording medium were respectively as follows:

$T_{c1}$=150° C.

$T_{c2}$=260° C.

$T_{pc}$=120° C.

$T_a$=80° C.

$T_b$=200° C.

The recording and reproducing characteristics of this recording medium were evaluated in the same manner as in Example 1. As a result, the C/N ratio thereof was 48 dB. Signals with a recording frequency of 2 MHz were overwritten on the above recording medium under the same conditions as mentioned above. The result was that the C/N ratio was 48 dB, which was excellent.

The magneto-optical recording medium of the present invention is capable of attaining reliable overwriting with a single beam and a single magnetic field.

What is claimed is:

1. A magneto-optical recording medium comprising a substrate and, provided thereon, a recording layer which comprises:

(a) a memory layer, having a Curie temperature higher than room temperature, consisting of a ferromagnetic layer with perpendicular anisotropy, and (b) an auxiliary layer consisting of an antiferromagnetic layer which exhibits an antimagnetic phase at room temperature, and a ferromagnetic phase at temperatures near the Curie temperature of said memory layer, because of the occurrence of magnetic phase transformation, with said memory layer and said auxiliary layer being overlaid, said auxiliary layer consisting of $Mn_2Sb$ or $Mn_{2-q}SbY_q$ in which Y is Cr, Ti or V and $0<q\leq 2$.

2. The magneto-optical recording medium as claimed in claim 1, further comprising an intermediate layer which is interposed between said memory layer and said auxiliary layer, and functions to adjust the exchange bonding force between said memory layer and said auxiliary layer.

3. The magneto-optical recording medium as claimed in claim 1, wherein said auxiliary layer has a thermal conductivity which is lower than that of said memory layer.

4. The magneto-optical recording medium as claimed in claim 2, wherein said auxiliary layer has a thermal conductivity which is lower than that of said memory layer.

* * * * *